Dec. 18, 1934.  M. J. LIDE  1,984,684

CONCENTRATING MECHANISM

Filed Aug. 22, 1932  2 Sheets-Sheet 1

INVENTOR
Martin J. Lide
BY
Johnston & Jennings
ATTORNEYS

Dec. 18, 1934.  M. J. LIDE  1,984,684
CONCENTRATING MECHANISM
Filed Aug. 22, 1932  2 Sheets-Sheet 2
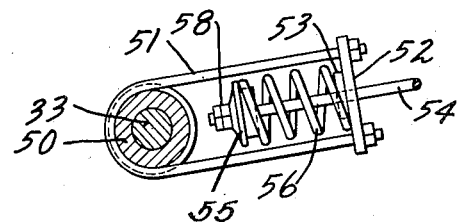
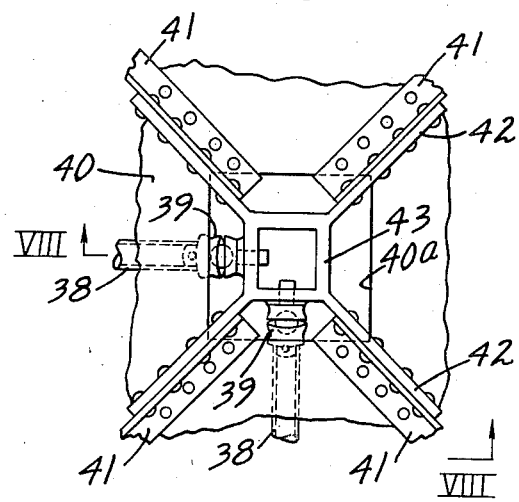
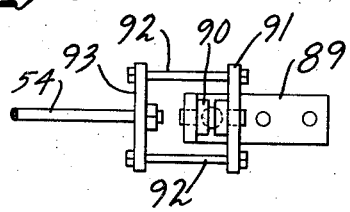
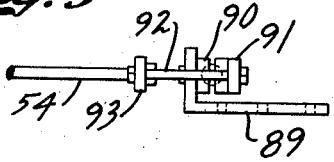
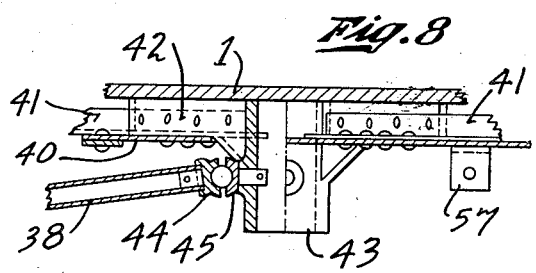
INVENTOR
Martin J. Lide
BY
Johnston & Jennings
ATTORNEYS Patented Dec. 18, 1934

1,984,684

UNITED STATES PATENT OFFICE 1,984,684

CONCENTRATING MECHANISM

Martin J. Lide, Birmingham, Ala.

Application August 22, 1932, Serial No. 629,792

8 Claims. (Cl. 209—504)

My invention relates to a concentrating mechanism of the type in which a table is employed, whether wet or dry or perforated for utilization with an air current, to which table is imparted oscillatory motion longitudinally and/or laterally by my improved type of mechanism.

In my present invention, I contemplate utilizing, as a preferred drive, the mechanism forming the subject matter of my U. S. Patent No. 1,757,320 granted May 6, 1930, and I prefer in my present arrangement to employ two of such drives, working at right angles to each other and both connected to a central thrust plate under the table.

One object of my present invention concerns the arrangement and location of this thrust plate and the manner in which it is braced to the table structure.

Another distinctive feature of my present application is the manner in which the drive and spring return for the table are assembled and connected to this thrust plate.

Another distinctive feature of my present invention is the mounting of the table on four corner posts adapted for universal motion with three corner posts connected for joint and co-ordinated adjustment.

My invention further comprises the novel details of construction and arrangements of parts, which are hereinafter more particularly described and pointed out in the appended claims, reference being had to the accompanying drawings which form a part of this specification, and in which Fig. 1 is a plan view of my improved concentrating mechanism as adapted for dry or wet separation, riffles being shown formally;

Fig. 3 is an enlarged detail sectional view of the mounting for one end of the table return spring;

Figs. 4 and 5 are plan and side views, respectively, showing one type of connection for the spring return mechanism to the table proper;

Fig. 6 is a detail view of one of the thrust ball seats, as used in the spring return mechanism and in connection with the thrust rod;

Fig. 7 is a plan view of the center thrust plate to which the table oscillating mechanism is connected, the table not being shown; and Fig. 8 is a sectional view taken on the line VIII—VIII of Fig. 7.

Similar reference numerals refer to similar parts throughout the drawings.

Figure 1:
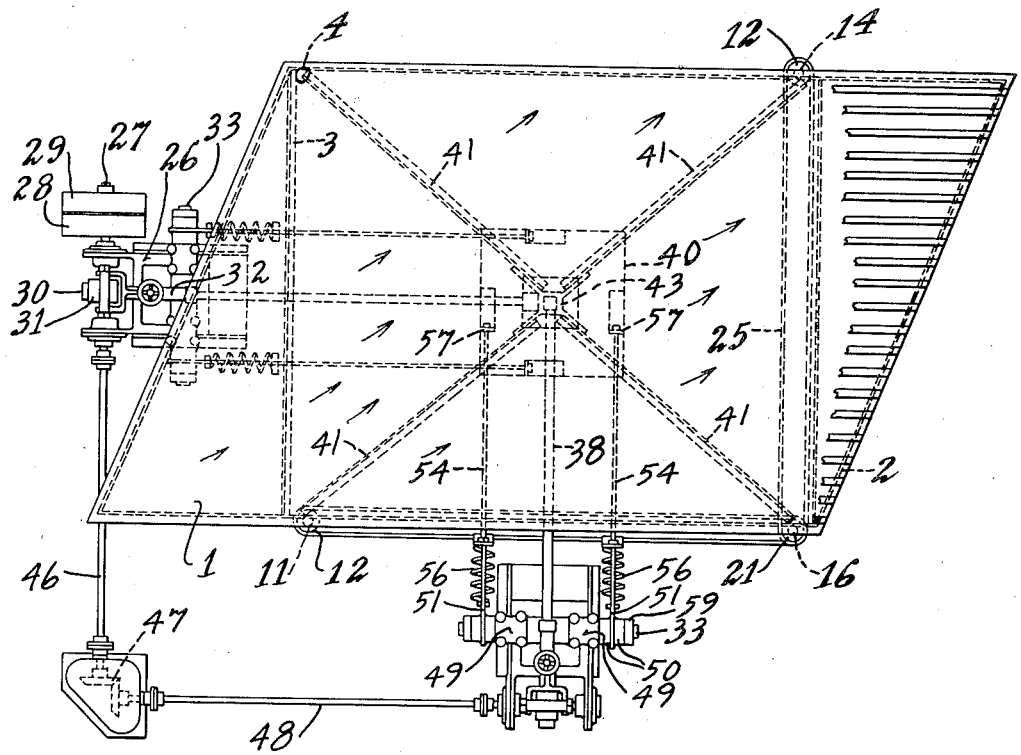
Figure 2:
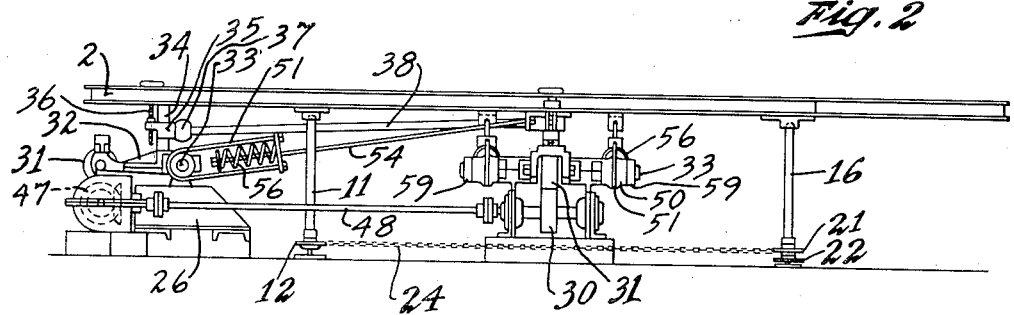
Fig. 2 is a side view of Fig. 1.

Referring to the drawings, I illustrate a table 1, preferably having a riffled surface, mounted upon a suitable metallic frame work 2, to which table the material to be concentrated is delivered at the left hand lower corner, as seen in Fig. 1, and is caused to travel across the table surface in the direction of the arrows, and after concentration to be discharged from the side and end toward which the arrows are directed. This table is supported by four oscillatory legs 4, 11, 14 and 16, which are preferably disposed near the four corners of a quadrilateral formed by the end frame members and transverse bottom brace members 3.

The legs 11, 14 and 16 may be adjusted vertically by means of threaded sprockets 12 on legs 11 and 14, and threaded sprockets 21 and 22 on leg 16. The sprockets on the legs 11 and 16 are connected by means of a chain 24, and a chain 25 connects the sprocket 22 with the sprocket of the leg 14. By this arrangement, the length of the side legs 11 and 16 can be similarly and equally adjusted, and the length of the end legs 14 and 16 can likewise be equally adjusted.

The actuating mechanism for oscillating the table follows the construction forming the subject matter of my U. S. Patent No. 1,757,320 issued May 6, 1930, and comprises a base casting 26 in which a shaft 27 having fast and loose pulleys 28 and 29 thereon, acts to drive a cam coacting with rollers 31, each carried by a bell crank rocker 32 journaled on a shaft 33 and having an upright arm 34 having slidably mounted thereon a slide block 35 vertically adjustable by means of a screw 36.

This slide block 35 is connected by a ball joint 37 to a thrust rod 38, which in turn is suitably connected by a similar ball joint 39 to a center thrust plate 40 attached to the center of the table and braced to the marginal frame work of the table by the diagonal braces 41. This plate has a central aperture 40a (Fig. 7) to receive a central hollow body portion 43 having spider arms 42. To each of these arms 42 is bolted one of the brace angles 41. The ball bearing 39 comprises a ball seat 44 attached to the thrust rod 38 and a ball seat 45 (see Fig. 6) having its shank inserted through the wall of the body member 43 and pinned in position therein. The parts for the driving mechanism thus far described are disposed at one end of the table. If desired, a similar mechanism can be disposed opposite the center plate at the side of the table and the shaft 27 carrying the cam for this latter mechanism is driven by means of the fast pulley 28 through a shaft 46, right angled bevelled gears 47 and a shaft 48 to its respective shaft 27, thus co-ordinating the cams and at the same time permitting the cams to be set relatively out of synchronous action as may be desired by a change in the mesh of the gears 47.

The shaft 33 for each of the rockers is projected beyond its bearings 49 and receives at each end a pair of blocks 50 which are circumferentially grooved, as seen in Fig. 3, to receive between them a U-bolt 51 which at its outer end is connected to a bar 52 carrying a spring seat 53 through the center of which is an opening for a rod 54 which at its outer end carries a seat 55 for a coil spring 56 interposed between the seats 53 and 55. The rod 54 at its inner end is connected to a bracket 57 bolted to the thrust plate 40. The nuts 58 permit the tension on the spring to be adjusted and the U-bolt 51 is free to rock about the shaft 33, due to the fact that the blocks 50 are not made fast thereon but are held in position thereon by a set collar 59. I thus provide for each actuating mechanism a pair of table returning spring rigs set on each side of its respective thrust rod 38 so that by adjusting the spring tension of each rig separately the movement of the table may be equalized on both sides of each push rod, thus enabling me to overcome any displacement of the center of gravity of the table relative to the line of thrust from the push rods.

In Figs. 4 and 5 I show a modified form of means for connecting the rods 54 to the plate 40. In this modification there is substituted for the bracket 57 a bracket 89 carrying a ball seat 90 receiving a ball and a corresponding seat upon a cross arm 91 which is connected by bolts 92 to a cross arm 93 to which in turn the rod 54 is connected. This will provide a frictionless universal joint between the thrust rods 54 and the table.

In the operation of my improved table, having adjusted the legs so as to support the table with the desired lateral inclination, upon starting up the drive, the end and side cams 30 will act upon their respective end and side rockers to impart in conjunction with their respective opposing springs both longitudinal and lateral oscillations to the table, which oscillations may be timed synchronously or in any desired coordinated relationship according to the action desired so that the table may commence its motion in both directions at the same time, or one motion may commence ahead of or behind the other motion as operating conditions may indicate. The result is to produce joint lateral and longitudinal oscillations which will tend to stratify and separate the material on the table and discharge it with a travel in the direction of the arrows, Fig. 1.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:

1. A concentrating mechanism comprising a table having a substantially centrally disposed bottom thrust plate, rocking supports provided under each side of the table, a drive mechanism for oscillating the table comprising a cam driven rocker element, a thrust rod engaging said element and said thrust plate, and spring means connecting the table with a relatively stationary element to oppose the action of said thrust mechanism, said spring means being disposed on opposite sides of the thrust rods.

2. A concentrating mechanism comprising a table having rocking supports under each side thereof and a substantially centrally disposed thrust plate secured to the table on the underside thereof, an oscillating mechanism comprising two power driven cam operated rocker elements working at right angles to each other, a centrally disposed thrust connection from each rocker element to said thrust plate, and a spring rig on opposite sides of each thrust connection and coacting between the table and a relatively fixed element to oppose its respective drive.

3. A concentrating mechanism comprising a table having rocking supports under each side thereof and means to oscillate the table comprising a power driven oscillatory rocker, a frame for the rocker, an antifriction thrust connecting rod extending from the rocker to the table, balanced spring rigs working on each side of the rocker and having means to connect them at one end to the table, and at the other end to the rocker frame, and means to adjust said spring rigs with respect to each other.

4. In a concentrating apparatus, a concentrating table, oscillatory supports for the table, a centrally disposed thrust plate on the underside of the table, a thrust rod connected to the thrust plate to transmit motion to the table, cam operated means for imparting reciprocatory motion to the thrust rod, means for adjusting the stroke of the thrust rod, and spring means on opposite sides of the thrust rod and coacting between the table and a relatively fixed element for opposing the motion of the thrust rod.

5. In a concentrating apparatus, a concentrating table, oscillatory supports for the table, a centrally disposed thrust plate on the underside of the table, a pair of thrust rods connected to the thrust plate at right angles to each other to transmit longitudinal and transverse motion to the table, cam operated means for imparting reciprocatory motion to each of the thrust rods, means for separately adjusting the stroke of each of the thrust rods, and spring means on opposite sides of each of the thrust rods and coacting between the table and a relatively fixed element for opposing the motion of the thrust rods.

6. In a concentrating table having four universally rocking leg supports, a centrally disposed thrust plate connected to the underside of the table, two thrust rods acting substantially at right angles against said thrust plate, two oscillating cam operated mechanisms each arranged to adjustably reciprocate the table horizontally through the two thrust rods, a pair of adjustable springs opposing each thrust rod connected at one end of each spring to the movable table and at the other end to a relatively fixed support and disposed on either side of each thrust rod in a manner to control the oscillation of the table about a central axis approximately normal to the table, means to adjust the throw of each thrust rod independently, means to adjust the tension or compression in each spring independently, and actuating means to correlate and synchronize the motions of the two thrust rods.

7. A table according to claim 6, in which the table is imparted a relatively slow thrust by each rod and a relatively quick return by each pair of springs.

8. A table according to claim 6, in which each pair of supporting legs is independently adjustable in length.

MARTIN J. LIDE.